(12) United States Patent
Dozier

(10) Patent No.: US 6,260,896 B1
(45) Date of Patent: Jul. 17, 2001

(54) BARBECUE DEVICE

(76) Inventor: James E. Dozier, 3461 Crayrich Dr., Hoover, AL (US) 35226

( * ) Notice: Subject to any disclaimer, the term of this patent is extended or adjusted under 35 U.S.C. 154(b) by 0 days.

(21) Appl. No.: 09/569,884

(22) Filed: May 12, 2000

(51) Int. Cl.[7] .................................................. F24B 15/00
(52) U.S. Cl. .................................................. 294/9; 294/1.1
(58) Field of Search .................................. 294/1.1, 5.5, 9, 294/10, 14, 19.2, 50.6, 55.5, 23.5, 7; 101/31; D7/688, 690; D30/155; 30/322; 56/400.01, 400.21

(56) References Cited

U.S. PATENT DOCUMENTS

| D. 116,798 | 9/1939 | Erickson | D7/690 |
|---|---|---|---|
| D. 186,947 | 12/1959 | Jackle et al. | D7/688 |
| D. 268,536 | 4/1983 | Davis | D30/155 |
| 332,729 | 12/1885 | McLellan | 294/5.5 |
| 1,533,405 | 4/1925 | Griffin | D7/688 |
| 2,775,477 | 12/1956 | Inouye | 294/55.5 |
| 2,836,402 | 5/1958 | Barnes et al. | D7/688 |
| 5,177,941 | 1/1993 | Tharp et al. | 56/400.01 |
| 5,833,284 | 11/1998 | Vandamme | 294/5.5 |
| 5,997,062 | 12/1999 | Schwartz | 294/19.2 |
| 6,000,739 | 12/1999 | Zemit et al. | 294/9 |

*Primary Examiner*—Dean J. Kramer

(57) ABSTRACT

A barbecue device for spreading and manipulating charcoal within a grill. The barbecue device includes a raking portion and a handle portion. The raking portion comprises a pair of pronged portions. Each of the pronged portions is integrally coupled together. The handle portion includes a rod and a handle member. The rod is elongate having a first and second end. The second end of the rod is integrally coupled to the raking portion. The handle member has a first end and a second end. The first end of the handle member is fixedly coupled to the first end of the rod.

7 Claims, 2 Drawing Sheets

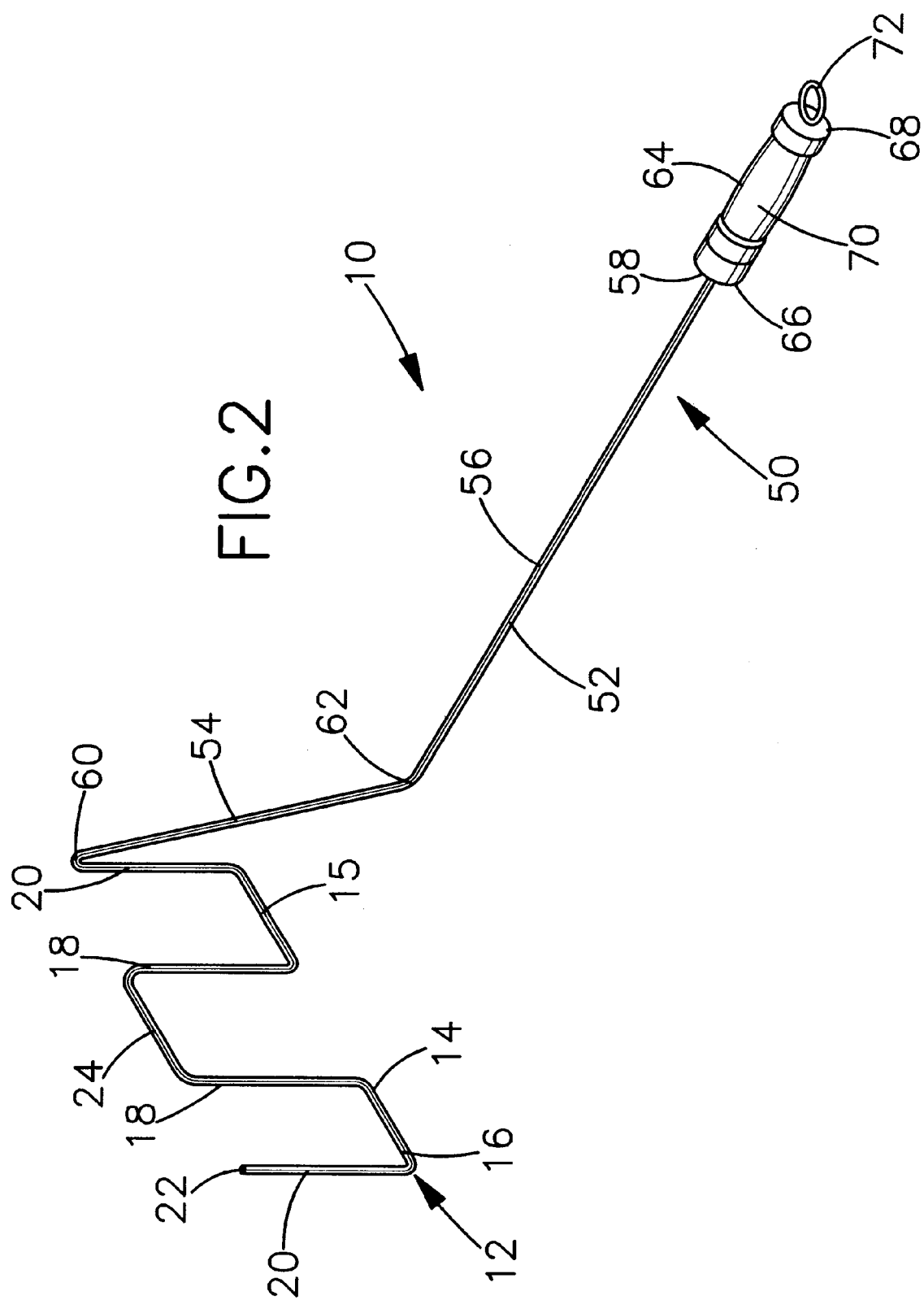

BARBECUE DEVICE

BACKGROUND OF THE INVENTION

1. Field of the Invention

The present invention relates to barbecue devices and more particularly pertains to a new barbecue device for spreading and manipulating charcoal within a grill.

2. Description of the Prior Art

The use of barbecue devices is known in the prior art. More specifically, barbecue devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 3,807,380; U.S. Pat. No. 3,153,136; U.S. Pat. No. 5,729,854; U.S. Des. Pat. No. 386,578; U.S. Pat. No. 4,478,449; and U.S. Pat. No. 4,889,375.

While these devices fulfill their respective, particular objectives and requirements, the aforementioned patents do not disclose a new barbecue device. The inventive device includes a raking portion and a handle portion. The raking portion comprises a pair of pronged portions. Each of the pronged portions is integrally coupled together. The handle portion includes a rod and a handle member. The rod is elongate having a first and second end. The second end of the rod is integrally coupled to the raking portion. The handle member has a first end and a second end. The first end of the handle member is fixedly coupled to the first end of the rod.

In these respects, the barbecue device according to the present invention substantially departs from the conventional concepts and designs of the prior art, and in so doing provides an apparatus primarily developed for the purpose of spreading and manipulating charcoal within a grill.

SUMMARY OF THE INVENTION

In view of the foregoing disadvantages inherent in the known types of barbecue devices now present in the prior art, the present invention provides a new barbecue device construction wherein the same can be utilized for spreading and manipulating charcoal within a grill.

The general purpose of the present invention, which will be described subsequently in greater detail, is to provide a new barbecue device apparatus and method which has many of the advantages of the barbecue devices mentioned heretofore and many novel features that result in a new barbecue device which is not anticipated, rendered obvious, suggested, or even implied by any of the prior art barbecue devices, either alone or in any combination thereof.

To attain this, the present invention generally comprises a raking portion and a handle portion. The raking portion comprises a pair of pronged portions. Each of the pronged portions is integrally coupled together. The handle portion includes a rod and a handle member. The rod is elongate having a first and second end. The second end of the rod is integrally coupled to the raking portion. The handle member has a first end and a second end. The first end of the handle member is fixedly coupled to the first end of the rod.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new barbecue device apparatus and method which has many of the advantages of the barbecue devices mentioned heretofore and many novel features that result in a new barbecue device which is not anticipated, rendered obvious, suggested, or even implied by any of the prior art barbecue devices, either alone or in any combination thereof.

It is another object of the present invention to provide a new barbecue device which may be easily and efficiently manufactured and marketed.

It is a further object of the present invention to provide a new barbecue device which is of a durable and reliable construction.

An even further object of the present invention is to provide a new barbecue device which is susceptible of a low cost of manufacture with regard to both materials and labor, and which accordingly is then susceptible of low prices of sale to the consuming public, thereby making such barbecue device economically available to the buying public.

Still yet another object of the present invention is to provide a new barbecue device which provides in the apparatuses and methods of the prior art some of the advantages thereof, while simultaneously overcoming some of the disadvantages normally associated therewith.

Still another object of the present invention is to provide a new barbecue device for spreading and manipulating charcoal within a grill.

Yet another object of the present invention is to provide a new barbecue device which includes a raking portion and a handle portion. The raking portion comprises a pair of pronged portions. Each of the pronged portions is integrally coupled together. The handle portion includes a rod and a handle member. The rod is elongate having a first and second end. The second end of the rod is integrally coupled to the raking portion. The handle member has a first end and a second end. The first end of the handle member is fixedly coupled to the first end of the rod.

Still yet another object of the present invention is to provide a new barbecue device that resists burn injuries for persons spreading heat coals within a grill.

Even still another object of the present invention is to provide a new barbecue device that has a multiple pronged head for easy movement of the coal.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 2 is a schematic bottom perspective view of the present invention.

DESCRIPTION OF THE PREFERRED EMBODIMENT

Figure 1:
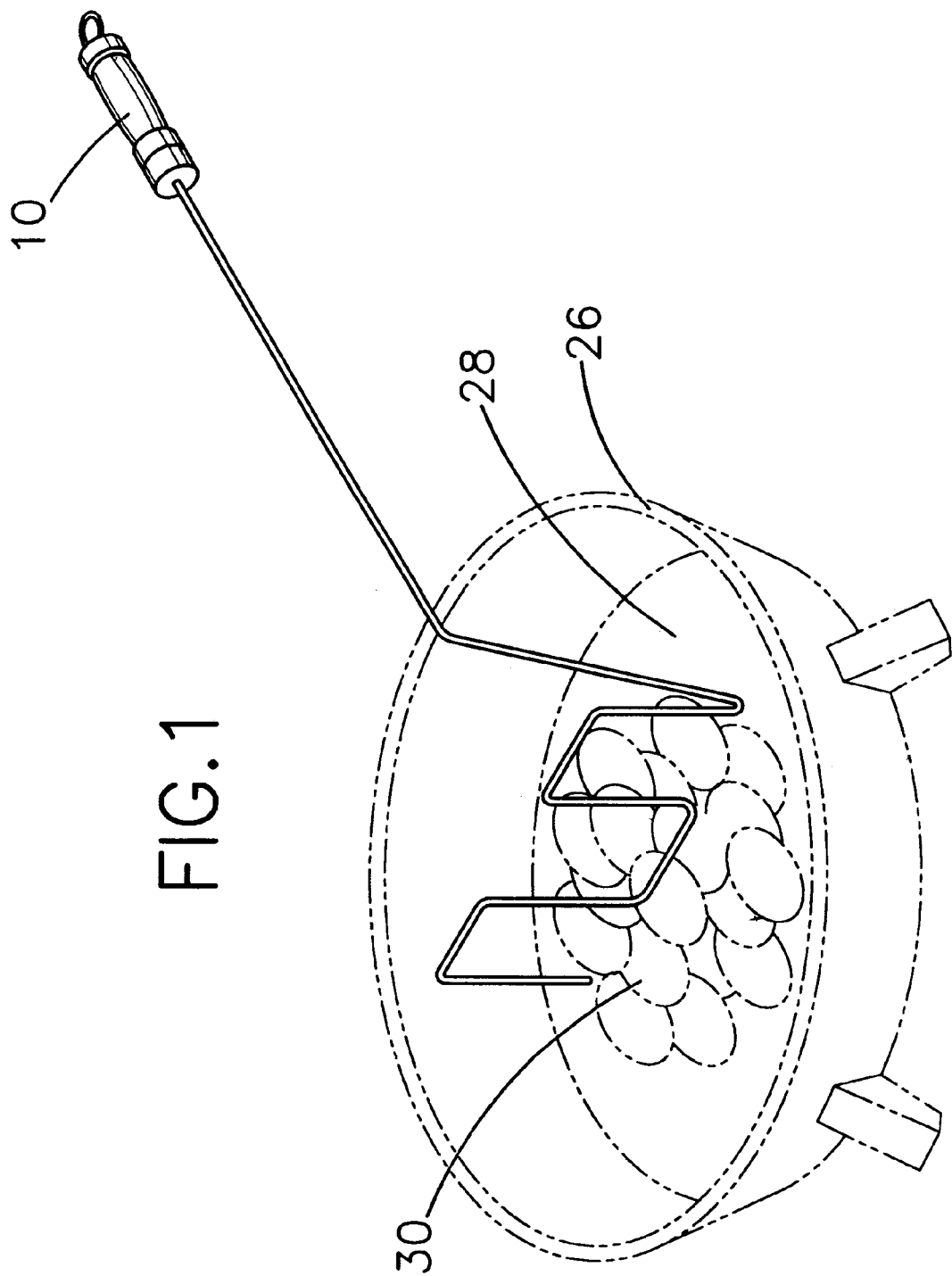
FIG. 1 is a schematic top perspective view of a new barbecue device according to the present invention.

With reference now to the drawings, and in particular to FIGS. 1 through 2 thereof, a new barbecue device embodying the principles and concepts of the present invention and generally designated by the reference numeral 10 will be described.

As best illustrated in FIGS. 1 through 2, the barbecue device 10 generally comprises a raking portion 12 and a handle portion 50.

The raking portion 12 ideally has a pair of pronged portions 14, 15. Each of the pronged portions is integrally coupled together. Each of the pronged portions comprising a U-shaped member having a base portion 16 and two legs 18, 20. The legs 18, 20 each have a free end 22. A free end 22 of a first leg 18 of a first 14 of the U-shaped members is integrally coupled to a free end 22 of a first leg 18 of a second 15 of the U-shaped members by a bar 24 such that the first 14 and second 15 U-shaped members are substantially lying in a plane. The bar 24 is orientated generally perpendicular to the legs 18, 20 of the U-shaped members. Each of the base portions 16 generally lie along a line. Preferably, the raking portion 12 comprises a metal which would conventionally be used for grilling purposes. The raking portion preferably has a height between 1 and 4 inches and a length between 3 and 6 inches.

The handle portion 50 includes a rod 52. The rod 52 is elongate and has a distal portion 54 and a proximal portion 56. The rod also has a first end 58 and second end 60, wherein the proximal portion 56 is adjacent to the first end 58. The second end 60 of the rod is integrally coupled to the raking portion 12. The rod 52 is orientated generally perpendicular to a plane of the raking portion 12. The second end 60 is preferably coupled to the free end of a second leg 20 of one of the U-shaped members 15 though it could also be coupled to the bar 24. The rod 52 has a bend 62 therein. The bend 62 is nearer the first end 58 than the second end 60 such that the distal portion 54 of the rod is in an angular relationship with the proximal portion 56 of the rod 52 such that the distal portion 54 extends in a direction generally toward the base portion 16 of the U-shaped member 15 from the free end of the second leg 20. Put more simply, the distal portion 54 extends upwardly away from the free end of the legs 20 to a point above the base portion 16 so that during use the user may keep the plane of the raking portion 12 orientated substantially perpendicular to the bottom wall 28 of the grill 26. The angular relationship is an angle generally between 100 and 140 degrees. An angle formed between the distal portion 54 of the rod 52 and the plane of the raking member 12 is generally between 10 and 45 degrees. Preferably, the rod 12 comprises a metal. The rod ideally has an overall length between 15 and 30 inches.

A handle member 64 has a first end 66 and a second end 68. The handle member 64 is generally tubular and has an undulating exterior surface 70. The first end 66 of the handle member is fixedly coupled to the first end 58 of the rod 52 such that the first end 58 of the rod extends into the handle member 64. The handle member 64 ideally comprises a wooden material though plastic or an elastomeric material could also be used.

A hanging means 72 for hanging the tool comprises an annular member. The annular member is fixedly coupled to the second end 68 of the handle member 64. The annular member ideally comprises a ring having a screw coupled thereto for being coupled to the handle member.

In use, the user places their charcoal within the grill 26 and lights it. When the coals, or charcoal, 30 are hot, the user uses the raking portion 12 to spread the charcoal about the grill 26 without danger of receiving a burn.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A barbecue tool for spreading charcoal in a grill, said tool comprising:

a raking portion, said raking portion comprising:
   a plurality of pronged portions, each of said pronged portions being integrally coupled together;

a handle portion, said handle portion comprising:
   a rod, said rod being elongate, said rod having a first and second end, said second end of said rod being integrally coupled to said raking portion; and
   a handle member, said handle member having a first end and a second end, said first end of said handle member being fixedly coupled to said first end of said rod;

said plurality of pronged portions being two pronged portions, each of said pronged portions comprising a U-shaped member, each of said U-shaped members having a base portion and two legs, each of said legs having a free end, wherein a free end of a first leg of a first of said U-shaped members is integrally coupled to a free end of a first leg of a second of said U-shaped members by a bar such that said first and second U-shaped members are substantially lying in a plane;

said rod being orientated generally perpendicular to a plane of said raking portion, said second end being coupled to the free end of a second leg of one of said U-shaped members; and a proximal portion and a distal portion, wherein said proximal portion is adjacent to said first end, said rod having a bend therein, said bend being nearer said first end than said second end such that said distal portion of said rod is in an angular relationship with said proximal portion of said rod.

2. The barbecue tool as in claim 1, wherein said handle member further comprises:

said handle member being generally tubular and having an undulating exterior surface, said first end of said handle member being fixedly coupled to said first end of said rod such that said first end of said rod extends into said handle member.

3. The barbecue tool as in claim 2, further comprising:

a hanging means for hanging the tool, said hanging means comprising an annular member, said annular member being fixedly coupled to said second end of said handle member.

4. A barbecue tool for spreading charcoal in a grill, said tool comprising:

a raking portion, said raking portion comprising:
   a pair of pronged portions, each of said pronged portions being integrally coupled together, each of said pronged portions comprising a U-shaped member, each of said U-shaped members having a base portion and two legs, each of said legs having a free end, wherein a free end of a first leg of a first of said U-shaped members is integrally coupled to a free end of a first leg of a second of said U-shaped members by a bar such that said first and second U-shaped members are substantially lying in a plane, said bar being orientated generally perpendicular to said legs of said U-shaped members, each of said base portions generally lying along a line, said raking portion comprising metal;

a handle portion, said handle portion comprising:
   a rod, said being elongate, said rod having a distal portion and a proximal portion, said rod having a first and second end, wherein said proximal portion is adjacent to said first end, said second end of said rod being integrally coupled to said raking portion, said rod being orientated generally perpendicular to a plane of said raking portion, said second end being coupled to the free end of a second leg of one of said U-shaped members, said rod having a bend therein, said bend being nearer said first end than said second end such that said distal portion of said rod is in angular relationship with said proximal portion of said rod such that said distal portion extends in a direction generally toward said base portion of said U-shaped member from said free end of said second leg, said angular relationship being an angle generally between 100 and 104 degrees, an angle being formed between said distal portion of said rod and the plane of said raking member being generally between 10 and 45 degrees, said rod comprising a metal;

a handle member, said handle member having a first end and a second end, said handle member being generally tubular and having an undulating exterior surface, said first end of said handle member being fixedly coupled to said first end of said rod such that said first end of said rod extends into said handle member, said handle member comprising a wooden material; and a hanging means for hanging the tool, said hanging means comprising an annular member, said annular member being fixedly coupled to said second end of said handle member, said annular member comprising a ring.

5. A barbecue tool for spreading charcoal in a grill, said tool comprising:

a raking portion, said raking portion comprising:
   a plurality of pronged portions, each of said pronged portions being integrally coupled together; and a handle portion, said handle portion comprising:
   a rod, said rod being elongate, said rod having a first and second end, said second end of said rod being integrally coupled to said raking portion, said rod having a proximal portion and a distal portion, wherein said proximal portion is adjacent to said first end, said rod having a bend therein, said bend being nearer said first end than said second end such that said distal portion of said rod is in an angular relationship with said proximal portion of said rod; and a handle member, said handle member having a first end and a second end, said first end of said handle member being fixedly coupled to said first end of said rod;

wherein said raking portion further comprises:
   said plurality of pronged portions being two pronged portions, each of said pronged portions comprising a U-shaped member, each of said U-shaped members having a base portion and two legs, each of said legs having a free end, wherein a free end of a first leg of a second of said U-shaped members is integrally coupled to a free end of a first leg of a second of said U-shaped members by a bar such that said first and second U-shaped members are substantially lying in a plane.

wherein said rod further comprises:
   said rod being orientated generally perpendicular to a plane of said raking portion, said second end being coupled to the free end of a second leg of one of said U-shaped members.

6. The barbecue tool as in claim 5, wherein said handle member further comprises:

said handle member being generally tubular and having an undulating exterior surface, said first end of said handle member being fixedly coupled to said first end of said rod such that said first end of said rod extends into said handle member.

7. The barbecue tool as in claim 5, further comprising:

a hanging means for hanging the tool, said hanging means comprising an annular member, said annular member being fixedly coupled to said second end of said handle member.

* * * * *